United States Patent
Padinjareveetil

(10) Patent No.: US 8,621,655 B2
(45) Date of Patent: *Dec. 31, 2013

(54) ENFORCING SINGLE STREAM PER SIGN-ON FROM A CONTENT DELIVERY NETWORK (CDN) MEDIA SERVER

(71) Applicant: Akamai Technologies, Inc., Cambridge, MA (US)

(72) Inventor: Abdul Salam Faisal Padinjareveetil, San Jose, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/651,491

(22) Filed: Oct. 15, 2012

(65) Prior Publication Data

US 2013/0042328 A1  Feb. 14, 2013

Related U.S. Application Data

(63) Continuation of application No. 12/650,612, filed on Dec. 31, 2009, now Pat. No. 8,291,504.

(60) Provisional application No. 61/141,964, filed on Dec. 31, 2008.

(51) Int. Cl.
*H04L 29/06* (2006.01)
*G06F 7/04* (2006.01)
*G06F 17/30* (2006.01)

(52) U.S. Cl.
USPC ............... 726/31; 726/8; 713/165; 709/203; 709/238

(58) Field of Classification Search
USPC ................. 726/8; 713/165; 709/203, 238
See application file for complete search history.

(56) References Cited

U.S. PATENT DOCUMENTS

| | | | |
|---|---|---|---|
| 6,405,318 B1 * | 6/2002 | Rowland | 726/22 |
| 7,721,339 B2 * | 5/2010 | Madison et al. | 726/27 |
| 7,958,524 B2 * | 6/2011 | Juneau | 725/14 |
| 7,962,635 B2 * | 6/2011 | Naidu et al. | 709/229 |
| 2002/0087885 A1 * | 7/2002 | Peled et al. | 713/201 |
| 2003/0172270 A1 * | 9/2003 | Newcombe et al. | 713/168 |
| 2005/0108361 A1 * | 5/2005 | Scott et al. | 709/217 |
| 2005/0278259 A1 * | 12/2005 | Gunaseelan et al. | 705/59 |
| 2006/0098795 A1 * | 5/2006 | Choti et al. | 379/114.14 |

(Continued)

OTHER PUBLICATIONS

Kontothanassis, Leonidas et al. "A Transport Layer for Live Streaming in a Content Delivery Network", 2004.*

(Continued)

*Primary Examiner* — Michael Simitoski
(74) *Attorney, Agent, or Firm* — David H. Judson

(57) ABSTRACT

An apparatus for enforcing a media stream delivery restriction uses a stream control service (SCS). The SCS is implemented in a distributed network, such as a CDN, in which a given media stream is delivered to authorized end users from multiple delivery servers, but where an authorized end user is associated with a single log-in identifier that is not intended to be shared with other end users. According to the method, an enforcement server of the SCS identifies first and second copies of the given media stream associated with the single log-in identifier being delivered from multiple delivery servers. It then issues message to terminate delivery of the given media stream from at least one of the multiple delivery servers.

8 Claims, 3 Drawing Sheets

(56) References Cited

U.S. PATENT DOCUMENTS

| | | | |
|---|---|---|---|
| 2006/0259984 A1* | 11/2006 | Juneau | 726/28 |
| 2007/0076872 A1* | 4/2007 | Juneau | 380/202 |
| 2007/0220155 A1* | 9/2007 | Nalla et al. | 709/227 |
| 2008/0115229 A1* | 5/2008 | Mallinson | 726/30 |
| 2009/0070800 A1* | 3/2009 | Gould et al. | 725/25 |
| 2009/0235347 A1* | 9/2009 | Syed et al. | 726/10 |

OTHER PUBLICATIONS

Pallis, George and Athena Vakali. "Insight and Perspectives for Content Delivery Networks", Jan. 2006.*

* cited by examiner

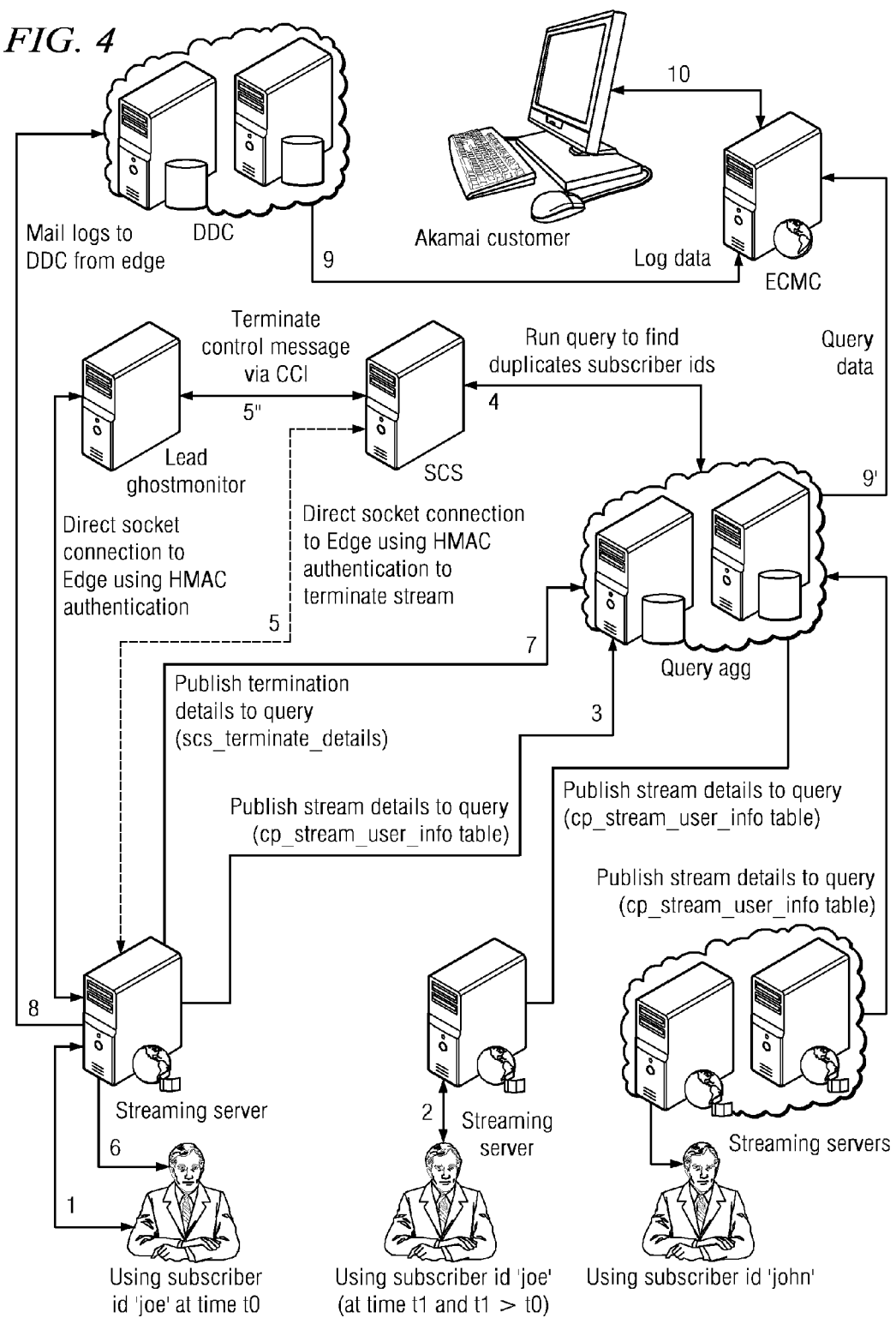

ENFORCING SINGLE STREAM PER SIGN-ON FROM A CONTENT DELIVERY NETWORK (CDN) MEDIA SERVER

CROSS-REFERENCE TO RELATED APPLICATION

This application is based on and claims priority to Ser. No. 12/650,612, filed Dec. 31, 2009, now U.S. Pat. No. 8,291,502, which application was based on Ser. No. 61/141,964, filed Dec. 31, 2008.

COPYRIGHT STATEMENT

This application also includes subject matter that is protected by copyright. All rights are reserved.

BACKGROUND OF THE INVENTION

1. Technical Field

This application relates generally to securing content that is delivered over a distributed computer network.

2. Brief Description of the Related Art

Distributed computer systems are well-known in the prior art. One such distributed computer system is a "content delivery network" or "CDN" that is operated and managed by a service provider. The service provider typically provides the content delivery service on behalf of third parties. A "distributed system" of this type typically refers to a collection of autonomous computers linked by a network or networks, together with the software, systems, protocols and techniques designed to facilitate various services, such as content delivery or the support of outsourced site infrastructure. Typically, "content delivery" means the storage, caching, or transmission of content, streaming media and applications on behalf of content providers, including ancillary technologies used therewith including, without limitation, DNS query handling, provisioning, data monitoring and reporting, content targeting, personalization, and business intelligence.

BRIEF SUMMARY OF THE INVENTION

A method for enforcing a media stream delivery restriction uses a stream control service (SCS). The SCS is implemented in a distributed network, such as a CDN, in which a given media stream is delivered to authorized end users from multiple delivery servers, but where an authorized end user is associated with a single log-in identifier that is not intended to be shared with other end users. According to the method, an enforcement server of the SCS identifies first and second copies of the given media stream associated with the single log-in identifier being delivered from multiple delivery servers. It then issues message to terminate delivery of the given media stream from at least one of the multiple delivery servers.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 4 illustrates a more detailed implementation of the single stream per sign-on enforcement system.

DETAILED DESCRIPTION

Figure 1:
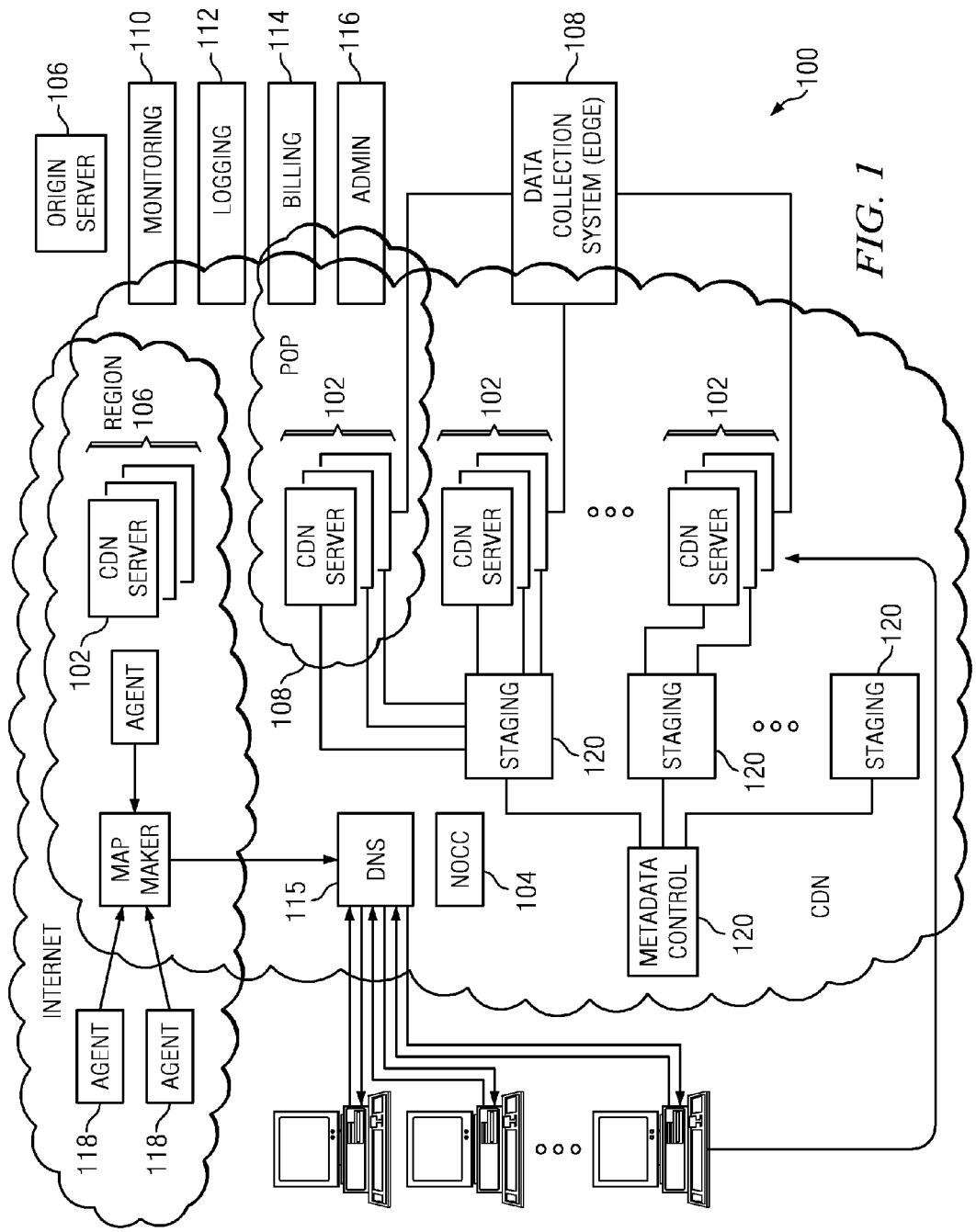
FIG. 1 is a content delivery network in which the subject techniques may be implemented.

As seen in FIG. 1, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 may be used to administer and manage operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire such content may be directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
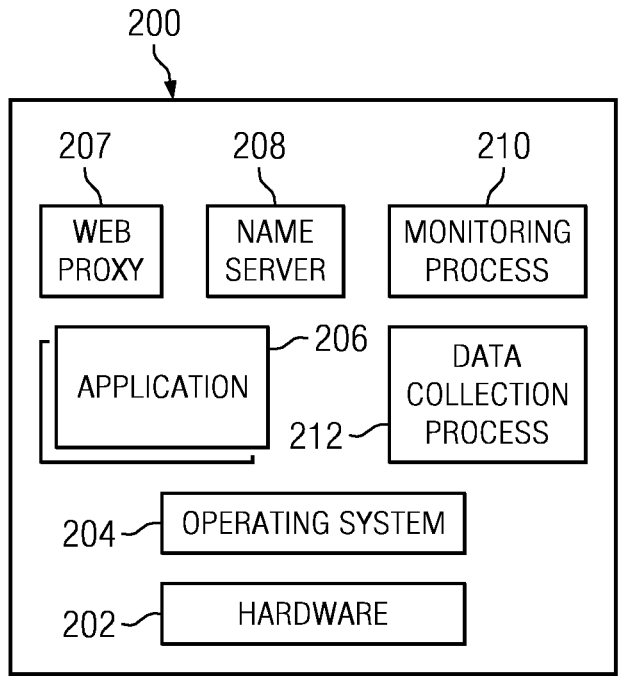
FIG. 2 is a machine on which a media server process is implemented to provide the described functionality.

As illustrated in FIG. 2, a given machine 200 comprises commodity hardware (e.g., an Intel Pentium processor) 202 running an operating system kernel (such as Linux or variant) 204 that supports one or more applications 206a-n.

To facilitate content delivery services, for example, given machines typically run a set of applications, such as an HTTP web proxy 207 (sometimes referred to as a "global host" or g-host process), a name server 208, a local monitoring process (sometimes referred to as "ghostmon") 210, a distributed data collection process (sometimes referred to as "query") 212, and the like. For streaming media, the machine typically includes one or more media servers, such as a Windows Media Server (WMS) or Flash 2.0 (or higher) server, as required by the supported media formats. The techniques disclosed herein may also be implemented when streaming delivery is effected using other protocols, such as HTTP.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The distributed data collection process 212 on the edge server provides "rows" of data for a set of tables. The rows from all (or a given subset of) edge servers are collected together on a set of one or more aggregators. An aggregator is a machine running an operating system and an aggregation utility that is part of the overall distributed data collection (DDC) system, which is sometimes referred to below as "Query." Clients (e.g., customers who access the Query system via an extranet portal or the like, sometimes referred to as ECMC) can then write SQL-style queries against the table data that is stored on the aggregator. When the edge server updates the rows that it is providing, those updates are visible on the Query aggregator (and thus the ECMC portal) within a given period of time (e.g., every few minutes).

It is assumed that the CDN also provides a secure streaming solution that enhances its streaming service by providing access control functionality. This streaming authentication solution allows content providers to authorize requests for streaming content, both live and on-demand. The solution provides a scalable protocol and a format-agnostic, extensible architecture for controlling access to content. Secure streaming can act as the underlying technology for services such as pay-per view, content syndication, and prevention of deep linking.

A known scheme for authentication is based on tokens. Authenticated content is accessible through a CDN URL (an ARL) that has a valid token attached to it. In other words, the token controls the access to the content. The CDN edge servers do the validation of the token and decide whether or not to stream the content. The streaming servers typically use shared secret information between the content provider and the CDN to verify the validity of the token.

By way of additional background, the following explains what happens when a user requests an ARL for an authenticated piece of content. Typically, it is the content provider that decides whether or not the streaming content is to be authenticated.

1. User requests a web page from an authentication-enabled web server. This would normally be a CDN customer (a content provider) or perhaps one of the provider's clients.
2. The web server dynamically generates an HTML document (a web page) tailor-made for that user. An authenticated ARL (AARL) is created at this point and embedded in the web page. Dynamic page generation is required for the highest level of authentication security. The web page contains a link (an AARL) to an authentication-required media file on the CDN network. The AARL contains an embedded authentication token that has been custom-generated for the specific user making the request.
3. The user's browser then uses the AARL to make a request to the CDN network. This could occur immediately when the HTML page renders, if the website designer has "embedded" the media clip into the web page; or it could occur when the user clicks a hotspot on a link in the HTML page.
4. If the request is authenticated, the CDN network returns the media file to the user's computer. The user's media player then plays the file. If the request is not authenticated, the user receives an "Access Denied" message.

Single Stream Per Sign-on

This disclosure provides a "single stream per sign-on" enforcement feature. In particular, CDN media customers that provide subscription-based services occasionally or often find that some subscribers share their sign-on information (username and password) with others such as friends and family. This sharing results in multiple concurrent logins to the customer's site. While the providers are able to identify and expire any previous sessions for a given subscriber (and ensure that only the most recent session is active), currently there is no mechanism to terminate a stream that is already active on the CDN network from a previous session. For example, say subscriber L logs-in to the provider's portal and starts playing stream $S_1$ (delivered over the CDN). While this is active, a new login for subscriber L occurs (possibly from a different location) and a new stream $S_2$ is initiated. According to this disclosure, it is desired to terminate the active stream $S_1$ to ensure that a given subscriber L is able to get only one active (and the most recently requested) stream at any point in time.

This single stream per sign-on feature is orthogonal to the limitations of the token-based streaming authentication scheme by which subscribers obtain and use tokens to initiate a streaming session. In the scenario described above, there is no sharing of tokens involved and the logins at the provider's portal get two completely independent and valid tokens from valid login sessions.

This solution provides many advantages, including cost-savings. Often content providers (such as Internet radio providers, professional sports leagues, and the like) distribute content that they have licensed from third party content owners. For these providers, the cost involved in stream distribution includes the bandwidth-related (CDN) costs as well as licensing fees based upon aggregate tuning hours. By ensuring that multiple streams per use are not available from the CDN, the customer's business requirements can be met.

The goal of the solution is to identify and terminate duplicate sessions within a given time period, such as N minutes.

Figure 3:
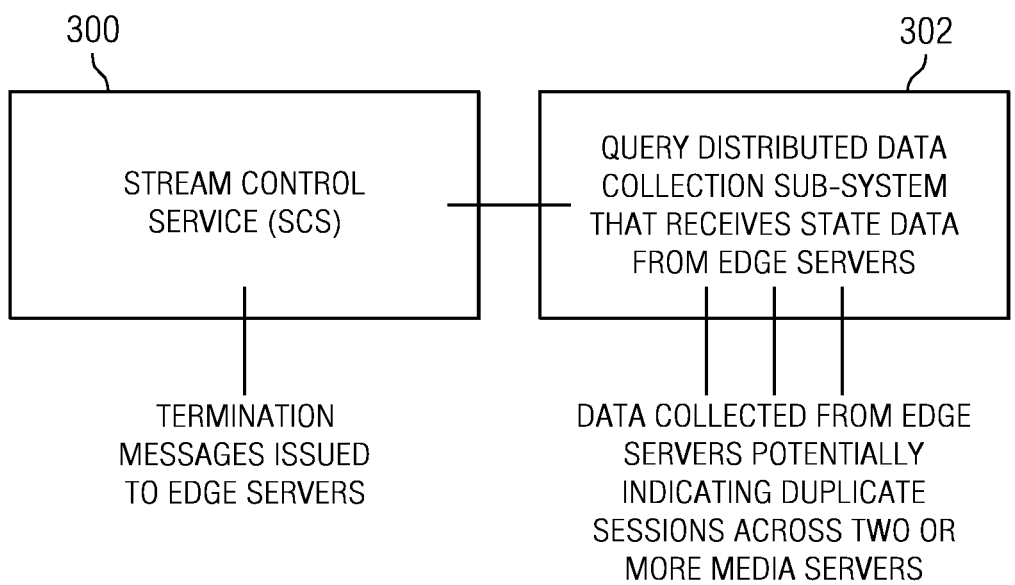
FIG. 3 illustrates a system for enforcing single stream per sign-on according to this disclosure.

The preferred solution is illustrates in FIG. 3 and uses a stream control service (SCS) 300 that interfaces to the CDN Query system 302. SCS 300 preferably is implemented as a set of one or more machines, each of which runs an operating system (e.g., Linux or a variant) and one or more software applications that, together with certain data, provide the following described functionality. The preferred operation is as follows:

Use Query for maintaining the global state on which streams/subscribers are active on what servers. The global state is maintained in a set of one or more data structures (linked lists, arrays, relational data tables, or the like) stored in or across one or more data stores, such as computer memory, a disk store, or the like. A preferred technique for maintaining this state information uses the Query system. In particular, the edge servers publish to Query a new table that has one row per active stream (for SCS-configured customers only). The information preferably includes at a minimum: the login-ID $L_1$ (a string), and the timestamp T of the stream request, both extracted, for example, from a streaming authentication (streaming-auth) token. Other state information preferably includes the server IP, the stream-name (live streaming reflector port or on-demand file name) and a cp-code (content provider code) of the request.

As illustrated in FIG. 3, the stream control service (SCS), preferably running as part of (or an adjunct to) the CDN streaming network, periodically checks Query, and identifies duplicate user sessions by login-ID per content provider account. Whenever SCS finds multiple streams from a given subscriber $L_1$ (e.g. $[L_1, T_n], [L_1, T_{n-1}], [L_1, T_{n-2}]$), it has identified duplicate streams.

The SCS then sends direct stream-termination messages to the required servers to terminate previous streams for a subscriber. That is, whenever SCS finds multiple streams $[L_1, T_n], [L_1, T_{n-1}], [L_1, T_{n-2}]$, where $T_n > T_{n-1} > T_{n-2}$, it sends termination requests for streams $(L_1, T_{n-1})$ and $(L_1, T_{n-2})$. In the case where SCS finds multiple streams with identical timestamps, it arbitrarily terminates all but one of them.

An edge server process listens for stream-termination requests coming from the SCS. On receiving a stream-termination request, it terminates the stream if the stream is still active on the server. It then returns an appropriate response back to the SCS. Preferably, the termination requests are sent/received using the (HMAC key based) secure communication API. A second approach here is to use back-end CDN infrastructure channels (such as the CCI described in U.S. Pat. No. 7,149,807) to talk to a lead ghost monitor process for the server region and send the control message to that process. The monitor process (sometimes referred to as ghostmon) then issues an in-region socket connection to the edge server to terminate the duplicate stream.

FIG. 4 details the workflow for this feature in more detail below using the nomenclature that has been previously identified. The numbered steps in FIG. 4 are explained below.

1. End user 1 logs in to customer website and gets a stream using user name 'joe' at time $t_0$.

2. End user 2 gets the user name and password for subscriber 'joe' and logs in to customer website and gets a stream using user name 'joe' at time t1 ($t_1 > t_0$). Now there are two streams active for subscriber 'joe'.

3. The CDN streaming edge server(s) publish into Query (the CDN distributed data collection sub-system) details about the subscriber and stream.

4. SCS machine(s) periodically run queries to find duplicate streaming sessions for a given customer account and subscriber id.

5. SCS identifies user name 'joe' is appearing twice in the query table and decides to terminate the first connection (started at time $t_0$). SCS sends a stream termination request to the edge server (running the duplicate stream session) using direct socket connection, or via alternative means.

6. Streaming edge server receives the termination message and terminates the stream.

7. Streaming edge server publishes termination action details into Query.

8. Streaming edge server preferably also logs the activity and mails the log to a distributed data collection (DDC) system at scheduled time.

9. A customer portal (an extranet) gets Query data and log data and reports the termination activities.

10. The CDN customer can view the termination details via the customer portal.

A number of variations on the above-described enforcement scheme may be implemented. As noted above, a solution to the above requirement involves two components:

Identification of duplicate sessions—a mechanism to identify when there are multiple streams per login id across the distributed network.

One solution (the preferred one, as described above) maintains global state on what users/streams are active on what servers. This can be accomplished either by using Query (as above), or by having the edge server send out log files with information on currently active streams, which are processed at a central location. Logs from different servers typically are not generated at the same time, and hence the central server will need to look across a time window to identify duplicate streams. Instead of using Query, the edge server can actively notify a remote origin/central server on every new connect or disconnect. An alternative would be asking the customer portal (or the entity that generates the stream auth token) to provide a notification on duplicate stream request in cases where such state is already maintained elsewhere.

Knowing where to send the termination request—once the enforcement service identifies that there is a second connection from a subscriber, the system needs to know where to send the termination request.

If global state is maintained as described above, then the address of the server that has the previous stream (if any) is readily available. Alternatively, if the customer portal or a token-generating application can notify the SCS on every new connection, SCS can send a broadcast message (e.g., using CDN back-end communications infrastructure) to the entire network (or some portion thereof) about the new connection for login-ID $L_1$ initiated at time T, and ask any previous streams with timestamp<T for login-ID L1 be terminated. This approach requires sending a broadcast message on every login to the entire (or some portion of the) network. Batch broadcasts may be used in this embodiment.

The following information is required at the edge server to publish into Query and then to later execute the stream termination command from SCS (if applicable).

StreamName: This name preferably is extracted from the incoming request URL. For on-demand streams, it is the file path. For live streams, it is the CDN reflector port. The stream name typically excludes the IP address of the edge machine and excludes any query parameters (e.g., auth token, aifp).

CP Code: The CP code information is extracted from the incoming request for non-CNAME ARLs. For CNAME URLs, the information returned from g-host may be used.

Subscriber ID: This information needs to be in the token payload, typically as "{usr=<end_user_subscriber_id>}" and the customer should not add any tracking parameters between the delimiters. Preferably, the subscriber ID can contain any characters between ASCII 32 to ASCII 124.

TimeStamp: The timestamp information is extracted from the token. This is the time at which the token was generated.

As noted above, preferably the edge server and SCS interaction involves sending control messages. The following section describes the basic scheme. The edge server gets direct notification from the SCS using a specified UDP port. A media server event plug-in (or other native code) uses this port to take commands from SCS. Preferably, an execution thread is implemented in the plug-in for this task. The communication scheme used preferably is HMAC authentication using secure read and write calls.

The SCS sends a command similar to the following to the edge server to request a stream termination.
terminate
scsip:172.26.161.81
subscriberid:joeuser
clientip:172.23.17.67
issuetime:1194377198
clientid:28
tokentime:1194338154 cpcode:1
stream:/D/1/1/abcxyz7/reflector:60500
connecttime:1194375268
streamstatus:playing
active_edgeip:172.26.161.90
active_clientip:172.23.17.67
active_tokentime:1194338154
active_cpcode:1
active_stream:D/1/1/abcxyz10/reflector:60500
active_connecttime:1194375274

Preferably, the edge server keeps information about each client connected in a hash table. In particular, preferably the server stores details in the hash table such as client_id, subscriber_id, cpcode and timestamp. Preferably, only streams that can be terminated are stored in this table. Specific auth flags (e.g., allow_terminate=1) determine whether a stream can be terminated by SCS. When the edge server machine receives a termination request from SCS, the edge machine uses clientid and connecttime from the termination request and verifies that this stream exists on the edge machine. If the stream does exist, the edge machine (in particular, a process executing thereon) terminates the stream. For a terminated stream, an entry is written to the scs_termination_details query table and the scsterm.internal.log, and this entry has a termination status of SUCCESS. If the stream does not exist, an entry is written to the scs_termination_details query table and the scsterm.internal.log, but with a termination status of IGNORE. If an error occurs during termination, the stream has a termination status of ERROR.

The following is an optimization to the above scheme. In this enhanced scheme, a communications channel infrastructure (CCI) (such as described in U.S. Pat. No. 7,149,807) is used to send the control messages from SCS to the edge servers. This is to make use of the multi-path capability of CCI. The CCI message is received by the lead ghost monitor in the region, and ghost monitor issues a direct socket connection to the edge server and passes the control command from SCS.

As noted above, when Query is used to maintain the state information, a new query table "cp_stream_user_info" is published into Query from the edge servers. Preferably, the following information is included so that SCS can query the table and make appropriate decisions.
  machineip: edge server ip publishing the data
  cpcode: CP code for the end user request
  client_id: This is a unique identifier for the client as defined by the edge server
  subscriber_id: end user login name extracted from the token payload
  tokentime: token creation timestamp
  streamname: file path or reflector port number
  connecttime: stream start time/connect time
  streamstatus: status of the stream (connected, playing, stopped)
  clientip: IP address of the end user.

Preferably, an entry is added to Query only if the secure streaming checks succeed and the stream is active for at least a given time period (e.g., 10 seconds) to prevent false stream terminations. This value (10 seconds) may be controlled via edge server configuration metadata. Preferably, the new Query table is reported for termination details and this table is reported from the edge. IGNORE cases due to multiple SCS messages are not reported to query by default.

As noted above, preferably the SCS uses Query to features to determine if data is available at the aggregator ports. This test query will be run periodically (e.g., every few seconds (should be configurable via metadata). If new data is available, SCS runs the query to find duplicate subscriber ids in Query and thus sharing the stream. In more detail, preferably SCS performs the following
  1. Extract rows from Query where a subscriber id appears more than once
  2. Check if subscriber id reported in the rows belong to the same customer account. This will be done via the Query tables cp_stream_user_info and cpmap. If yes, go to step 3; otherwise, ignore the rows.
  3. For each subscriber id in the Query output
    a. Extract the edge server ip, time stamp, starttime, streamname, cpcode and clientid associated
    b. Add the entry to a termination list
  4. Find the entry with the highest timestamp and exclude it from the termination list. If two entries have the same timestamp, use the starttime to find the stream to terminate (one with highest timestamp for start time will continue be active). If the starttime also same, SCS needs to pick one entry randomly.
  5. For each entry in the termination list,
    a. Issue the command "Terminate subscriber_id, timestamp, client_id, cpcode, streamname" using CCI or direct socket connection.
    b. Report to Query about the terminate activity
    c. Log an entry in the access log for the termination activity A sample query for finding duplicate login sessions for a customer account is given below:
SELECT a.machineip, a.cpcode, a.subscriber_id, a.streamname, a.client_id, a.streamstarttime, a.clientip, a.tokenstartime, a.streamstatus, c.accoutname FROM cp_stream_user_info a,
  (SELECT c.subscriber_id sub_id, m.accountname acc_name, count (c.subscriber_id) total
  FROM cp_stream_user_info c, cpmap m
  WHERE c.cpcode=m.cpcode
  GROUP BY c.subscriber_id, m.accountname
  HAVING total>1) b,
  cpmap c
WHERE a.subscriber_id=b.sub_id AND
  a.cpcode=c.cpcode AND
  b.acc_name=c.accountname While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the present invention is software written in a given programming language that runs in conjunction with a DNS-compliant name server (e.g., BIND) on a standard Intel hardware platform running an operating system such as Linux. The functionality may be built into appropriate server code, or it may be executed as an adjunct to that code. A machine implementing the techniques herein comprises a processor, computer memory holding instructions that are executed by the processor to perform the above-described data collection and enforcement methods. The machine also includes the state data.

While given components of the system have been described separately, one of ordinary skill will appreciate that some of the functions may be combined or shared in given instructions, program sequences, code portions, and the like.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

Having described my invention, what I now claim is as follows:

1. Apparatus for enforcing a media stream delivery restriction, where a media stream is delivered to authorized end users from multiple delivery servers in a distributed network, but where an authorized end user is associated with a single log-in identifier that is not intended to be shared with other end users, comprising:
    a set of distributed hardware processors;
    computer memory associated with each hardware processor;
    a stream control service implemented in program code held in computer memory and executed by a hardware processor to enforce the media stream delivery restriction, the program code comprising:
        code to identify first and second copies of the media stream associated with the single log-in identifier being delivered from multiple delivery servers; and
        code to issue a message to terminate delivery of the media stream from at least one of the multiple delivery servers.

2. The apparatus as described in claim 1 further including a distributed data collection service implemented in program code held in computer memory and executed by a hardware processor, the program code to maintain a state information about which media streams are active on which of the multiple delivery servers in the distributed network.

3. The apparatus as described in claim 2 wherein the state information is provided from the distributed data collection service to the stream control service on a periodic basis.

4. The apparatus as described in claim 2 wherein the distributed data collection service also includes code to log a termination of delivery of the media stream from the at least one of the multiple delivery servers.

5. The apparatus as described in claim 1 wherein the code to identify the first and second copies includes:
    code to examine a timestamp associated with each of the first and second copies; and
    code to examine a stream start time associated with each of the first and second copies if the first and second copies share a same timestamp.

6. The apparatus as described in claim 1 wherein the message is issued to a delivery server directly or via an associated delivery server.

7. The apparatus as described in claim 1 wherein the message is a broadcast message.

8. An apparatus to enforce a media stream delivery restriction, where a media stream is delivered to authorized end users from multiple delivery servers in a distributed network, but where an authorized end user is associated with a single log-in identifier $L_1$ received at time T that is not intended to be shared with other end users, comprising:
    a hardware processor;
    computer memory associated with the hardware processor to execute program code that identifies multiple streams $[L_1, T_n]$ and $[L_1, T_{n-1}]$ associated with the single log-in identifier being delivered from the multiple delivery servers, the multiple streams being first and second copies of the media stream, where $T_n > T_{n-1}$, and that, in response to such identification, sends a termination request for stream $(L_1, T_{n-1})$.

* * * * *